United States Patent

Ahlgrim et al.

[15] 3,647,514

[45] Mar. 7, 1972

[54] SURFACE-PRETREATMENT OF ARTICLES MADE FROM POLYETHYLENE OR POLYPROPYLENE OR CORRESPONDING COPOLYMERS FOR CHEMICAL NICKEL-PLATING

[72] Inventors: Michael Ahlgrim, Bliesheim; Joachim Kandler, Lechenich; Hans-Joachim Lenz, Lorsbach Taunus; Gerhard Mietens, Efferen near Cologne; Willy Ott, Lorsbach Taunus, all of Germany

[73] Assignee: Knapsack Aktiengesellschaft, Knapsack bei Cologne, Germany

[22] Filed: Aug. 12, 1969

[21] Appl. No.: 849,517

[30] Foreign Application Priority Data

Aug. 28, 1968 Germany ..................... P 17 94 029.3

[52] U.S. Cl. ................... 117/47 A, 117/138.8 E, 117/160 R
[51] Int. Cl. ........................................... C23c 3/02
[58] Field of Search ............... 117/47 A, 130 E, 138.8, 160; 106/1

[56] References Cited

UNITED STATES PATENTS

| 3,437,507 | 4/1969 | Jensen .................................. 117/47 A |
| 3,442,683 | 5/1969 | Lenoble et al. ....................... 117/47 A |
| 3,513,015 | 5/1970 | Fitzpatrick et al. .......... 117/138.8 E X |

FOREIGN PATENTS OR APPLICATIONS

| 794,749 | 9/1968 | Canada ................................ 117/47 A |
| 1,182,015 | 11/1964 | Germany ............................ 117/47 A |

*Primary Examiner*—Ralph S. Kendall
*Attorney*—Connolly and Hutz

[57] ABSTRACT

Pretreatment of surfaces of articles made from polyethylene or polypropylene or corresponding copolymers for chemical nickel-plating. The surface of the article is treated using a pickling solution of concentrated sulfuric acid or a combination of said acid with concentrated phosphoric acid, sensitized using an aqueous $SnCl_2$ solution, and activated using an aqueous solution containing one or more noble metal salts. The pickling step is carried out at a temperature of between about 75° and 95° C., using a pickling solution containing one or more noble metal salts in a concentration between about 0.1 and 0.5 gram per liter.

8 Claims, No Drawings

SURFACE-PRETREATMENT OF ARTICLES MADE FROM POLYETHYLENE OR POLYPROPYLENE OR CORRESPONDING COPOLYMERS FOR CHEMICAL NICKEL-PLATING

The present invention relates to the pretreatment of surfaces of articles made from polyethylene or polypropylene or corresponding copolymers for chemical nickel plating, by chemically roughening, sensitizing and activating the surface of the article to be nickel-plated.

German Pat. No. 1,182,015 describes a process which enables the surface of a nonmetallic article to be treated to receive, for example, a metallic nickel plating. To this end, the surface is first cleaned and then mechanically roughened using emery or sand. The article with the surface so treated is activated by dipping it in a palladium salt solution and subsequently reducing the palladium salt deposited thereon, so as to produce palladium nuclei. Following this, the article so activated is nickel-plated in conventional manner by dipping it in a chemical nickel-plating bath having nickel ions and hypophosphite ions therein. The expression "pretreatment of the article to be plated" means all steps which are carried out prior to the actual nickel plating. The process described above can be used, for example, for metallizing the surface of plastics, rubber, glass, wooden or ceramic materials. The aqueous palladium salt solution suitable for surface activation preferably has a concentration of 35 milligrams per liter. When a hypophosphite salt is the reducing agent for the palladium salt, it is advantageous for it to be dissolved in the metallizing bath, in a concentration of 0.225 mol per liter. The steps suggested to be used in the above patent for the pretreatment of the article to be metallized are, however, not fully satisfactory. The reason for this resides more particularly in the mechanical roughening treatment of the article's surface, which is rather expensive with respect to time, material and work.

A variant of the process described in German Pat. No. 1,182,015 comprises first sensitizing the surface of the article to be metallized, using an aqueous $SnCl_2$ solution, and then activating it by means of palladium chloride. Following this, tin chloride is used for reducing the palladium chloride with the resultant formation of palladium nuclei on the surface of the article.

A further process for the pretreatment of plastics surfaces for chemical plating has been described in German published Pat. No. 1,264,921. It has been shown therein that it is substantially more advantageous for polystyrene copolymer plastics of the acrylonitrile/butadiene/styrene series to be pretreated for chemical plating, using a solution which enables the plastics surface to be roughened and activated simultaneously. This is achieved by using the roughening solution in combination, for example, with a mixture of concentrated sulfuric acid and chromic anhydride, and noble metal salts, such as silver salts, which immediately diffuse into the plastics material while its surface is changed under the action of the solution. During the reduction which follows, the pretreatment effects the formation of noble metal nuclei which tenaciously adhere to the plastics surface, and make chemically and electrically deposited metal layers tenaciously adhere thereto. As shown in Example 4 of German published Pat. No. 1,264,921, the metal layer deposited on the plastics material was found to have a bond strength of between 1 and 2 kiloponds, based on DIN 40 802 (German Industrial Standard).

The object of the present invention is to provide a process for the pretreatment of articles made from polyethylene or polypropylene or corresponding copolymers so as to enable the articles to be chemically plated with a well-adhering nickel plating. Heretofore it has not been possible by conventional processes to chemically metallize articles made from polyethylene or polypropylene or corresponding copolymers as the metal sheathing applied failed to adhere to the surface of the article.

The process of the present invention for the pretreatment of surfaces of articles made from polyethylene or polypropylene or corresponding copolymers for chemical nickel plating, wherein the surface of the article is treated using a pickling solution of concentrated sulfuric acid or a combination of said acid with concentrated phosphoric acid and optionally in further combination with an oxidant, sensitized using an aqueous $SnCl_2$ solution, and activated using an aqueous solution containing one or more noble metal salts comprises carrying out the pickling step at a temperature between about 75° and 95° C. while using a pickling solution containing one or more noble metal salts in a concentration between about 0.1 and 0.5 gram per liter pickling solution.

The noble metal dissolved in the pickling solution is preferably a palladium slat, more preferably palladium chloride. The pickling solution preferably contains the noble metal salt in a concentration of about 0.3 gram per liter solution. The pickling solution may be used in further combination with an oxidant, for example nitric acid, hydrogen peroxide, chromic acid or one or more alkali metal persulfates.

A preferred feature of the process of the present invention comprises using the pickling solution at a temperature between about 80° and 90° C.

The bond strength of the metal layer to be deposited on the articles has been found to be influenced by the periods during which the article to be treated is dipped in the pickling solution. These periods should preferably be between about 5 and 25 minutes.

The process of the present invention is generally carried out in the following manner: The degreased and superficially cleaned article is dipped for a certain period of time, for example, in a pickling solution heated to about 80°–90° C. and containing, for example, a palladium salt, and the article so pickled is rinsed using flowing water. Following this, the surface of the article is sensitized by dipping it in an aqueous stannous chloride solution, and the article is rinsed again using flowing water.

Following this, the surface of the article is activated by dipping it in an aqueous solution of a noble metal salt, for example palladium chloride, which is reduced with the resultant formation of metal nuclei under the action of the $SnCl_2$ applied to the article during the sensitizing step. The article with the surface so activated is rinsed for a short while using flowing water. No further pretreatment is necessary in accordance with the present invention. The article can then be nickel-plated in conventional manner in a chemical nickel-plating bath containing sodium hypophosphite and a nickel salt, for example in the manner described in German Pat. No. 1,182,015 or 1,193,764.

The commercial importance of the process of the present invention resides in the fact that it is the first to enable the surfaces of articles made from polyethylene or polypropylene or corresponding copolymers to be chemically plated with a nickel-plating of good bond strength between 8 and 10 kiloponds, based on German Industrial Standard 40 802.

The use of bath temperatures increased, for example, to 80°–90 C. (as compared with the bath temperatures of conventional pretreatment baths) in combination with a relatively low concentration of the noble metal salt in the pickling and activating baths further effects substantially complete reduction of the noble metal ions adhered to the surface of the article. This prevents the said ions from being introduced into and from spontaneously decomposing the chemical nickel-plating bath containing hypophosphite.

EXAMPLE

A polypropylene plastics sheet was dipped for 10 minutes in a pickling solution heated to 90° C. and subsequently rinsed for 5 minutes using flowing water. The pickling solution was composed of:

| | | |
|---|---|---|
| 1000 | grams $H_2SO_4$ | (98% strength) |
| 290 | grams $H_3PO_4$ | (85% strength) |
| 270 | grams $H_2O$ | |

```
15    grams CrO₃
0.3   gram PdCl₂
```

The sheet with the surface so pickled was sensitized by dipping it for 5 minutes in an aqueous stannous chloride solution in hydrochloric acid, at 20° C. The stannous chloride solution contained per liter 20 grams $SnCl_2$ and 10 grams concentrated hydrochloric acid dissolved therein. The sheet was rinsed once again for 5 minutes using flowing water. Following this, the sheet was activated by dipping it for 5 minutes in an aqueous $PdCl_2$ solution containing 0.3 gram $PdCl_2$ per liter and heated to 20° C. After having been rinsed again for 10 minutes in flowing water, the plastics sheet was nickel-plated using a commercial nickel-plating bath which had a pH-value of 5.5 and a temperature of 55° C. The nickel-plating bath was composed of:

| | | |
|---|---|---|
| $NiSO_4 \cdot H_2O$ | 0.11 | mol per liter |
| $NaH_2PO_2 \cdot H_2O$ | 0.28 | mol per liter |
| Nitrilotrismethylene-phosphonic acid | 0.12 | mol per liter |
| $Na_2HPO_4 \cdot 2 H_2O$ | 0.067 | mol per liter |
| $KH_2PO_4$ | 0.0067 | mol per liter |

The metal-plating applied to the plastics sheet was found to have a bond strength of 8–10 kiloponds/25 mm., based on German Industrial Standard 40 802.

We claim:

1. In the process for the pretreatment of surfaces of articles made from polyethylene or polypropylene or corresponding copolymers for chemical nickel plating, wherein the surface of the article is first pickled using a pickling solution of concentrated sulfuric acid or a combination of said acid with concentrated phosphoric acid, then following the pickling step the surface is sensitized using an aqueous $SnCl_2$ solution and then activated using an aqueous solution containing one or more noble metal salts, the improvement which comprises carrying out the pickling step at a temperature between about 75° and 95° C. while using a pickling solution containing one or more noble metal salts in a concentration between about 0.1 and 0.5 gram per liter.

2. The process of claim 1, wherein the noble metal salt is a palladium salt.

3. The process of claim 2, wherein the palladium salt is palladium chloride.

4. The process of claim 1, wherein the pickling solution contains the noble metal salt in a concentration of about 0.3 gram per liter.

5. The process of claim 1, wherein the pickling solution has an additional oxidant therein.

6. The process of claim 5, wherein the oxidant is a member selected from the group consisting of nitric acid, hydrogen peroxide, chromic acid and persulfates.

7. The process of claim 1, wherein the pickling step is carried out at a temperature between about 80° and 90° C.

8. The process of claim 1, wherein the article is dipped in the pickling solution for a period of between about 5 and 25 minutes.

* * * * *